(12) United States Patent
Kuehl et al.

(10) Patent No.: US 8,826,741 B2
(45) Date of Patent: Sep. 9, 2014

(54) MONITORING SYSTEM FOR AN ASSEMBLY THAT IS SUBJECT TO VIBRATIONS

(75) Inventors: Andreas Kuehl, Herzogenrath (DE); Goetz Langer, Roetgen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 701 days.

(21) Appl. No.: 12/999,722

(22) PCT Filed: Jun. 17, 2009

(86) PCT No.: PCT/DE2009/000833
§ 371 (c)(1),
(2), (4) Date: Mar. 21, 2011

(87) PCT Pub. No.: WO2009/152810
PCT Pub. Date: Dec. 23, 2009

(65) Prior Publication Data
US 2011/0167915 A1    Jul. 14, 2011

(30) Foreign Application Priority Data
Jun. 20, 2008 (DE) .......................... 10 2008 029 087

(51) Int. Cl.
*G01N 29/46* (2006.01)
*G01H 3/08* (2006.01)

(52) U.S. Cl.
USPC ................................. 73/660; 73/659

(58) Field of Classification Search
USPC ..................... 73/579, 587, 659, 660
See application file for complete search history.

(56) References Cited

U.S. PATENT DOCUMENTS

| 4,428,237 A * | 1/1984 | Zeger et al. ..................... 73/592 |
| 4,429,578 A * | 2/1984 | Darrel et al. ..................... 73/659 |
| 4,934,192 A * | 6/1990 | Jenkins ............................ 73/660 |
| 5,727,900 A * | 3/1998 | Sandstrom ................... 404/84.1 |

FOREIGN PATENT DOCUMENTS

WO    2005/012840 A    2/2005

* cited by examiner

*Primary Examiner* — Hezron E Williams
*Assistant Examiner* — Nashmiya Fayyaz
(74) *Attorney, Agent, or Firm* — Simpson & Simpson, PLLC

(57) ABSTRACT

A monitoring system for an assembly that is subject to vibrations. The system has a first unit for monitoring vibrations. The monitoring system permits the connection of a sensor unit that detects one or more measured values. A measured value converter with inputs for one or more measured values is provided to convert the values into a temporally variable analogue signal, in which at least one frequency portion represents one measured value. Other detected measured values and status parameters can thus be processed in one vibration monitoring unit.

11 Claims, 2 Drawing Sheets

MONITORING SYSTEM FOR AN ASSEMBLY THAT IS SUBJECT TO VIBRATIONS

Figure 1:
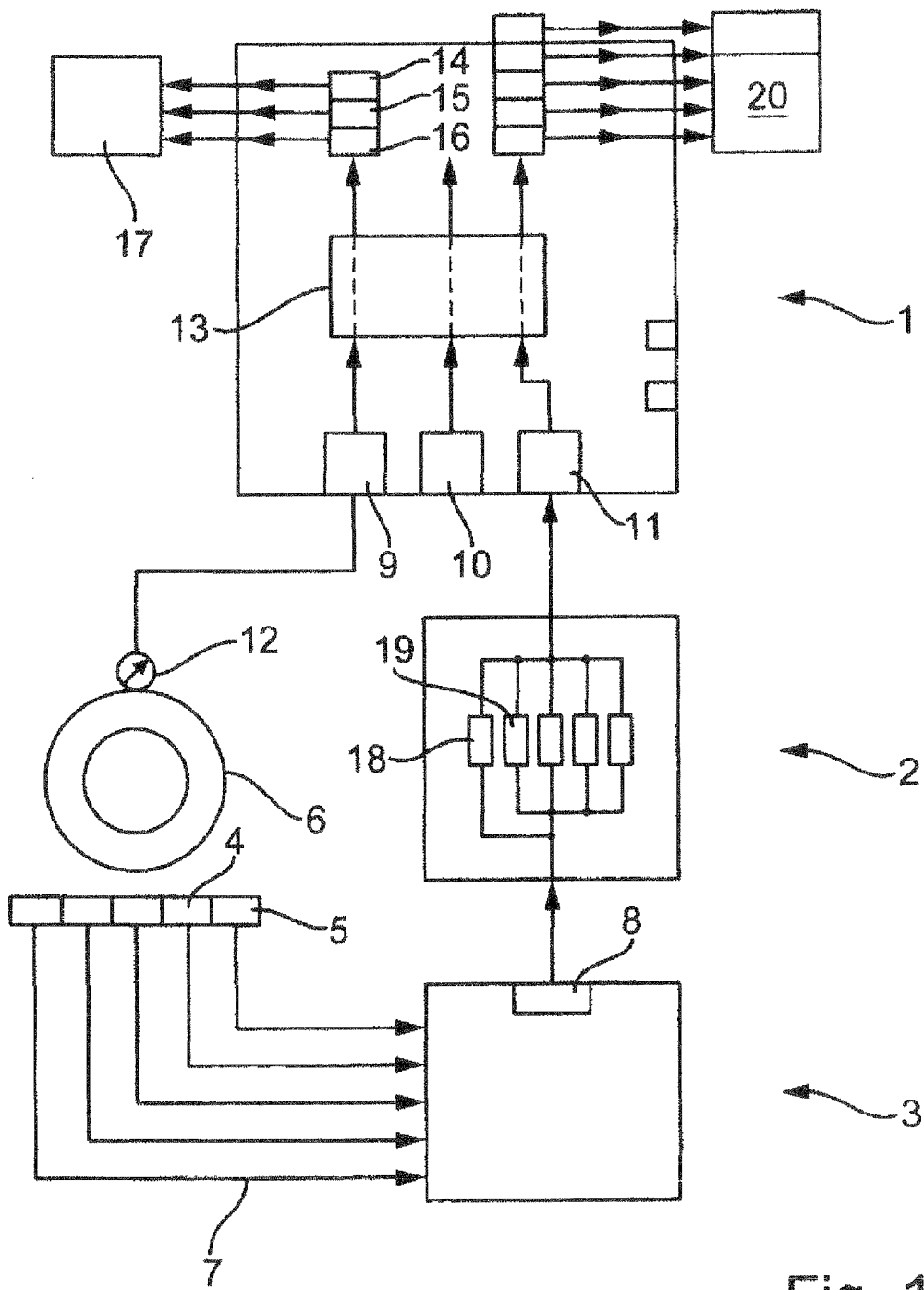

This application is a 371 of PCT/DE2009/000833 filed Jun. 17, 2009, which in turn claims the priority of DE 10 2008 029 087.4 filed Jun. 20, 2008, the priority of both applications is hereby claimed and both applications are incorporated by reference herein.

FIELD OF THE INVENTION

The invention lies in the field of mechanical engineering, specifically in the field of monitoring and control devices for assemblies and machines.

Technological development not only makes assemblies and machines more efficient, inexpensive and reliable, but also increases the demands for assemblies to allow themselves to be monitored along with their performance requirements.

BACKGROUND OF THE INVENTION

This also applies in particular to machines that are subject to mechanical or electrical loads, in particular those that are subject to vibrations, such as for example motors, generators and gear mechanisms.

Particularly when operating rotating machines, the occurrence of vibrations can scarcely be avoided. On the other hand, the detection of vibrations occurring allows many analyses to be carried out, for example of imbalances or bearing states.

Frequency measurements can therefore be used both for obtaining findings on the state of the bearings and for predicting future necessary maintenance and renewal work.

In order to monitor such machines, there are known monitoring devices for vibration analysis, which pick up corresponding combined acoustic or mechanical analog signals from machines and carry out a frequency analysis in the sense of a Fourier transformation or fast Fourier transformation in order to establish how strongly individual frequencies or frequency ranges are represented in the spectrum. The evaluation of the signal strengths of individual frequency ranges allows findings about the machine to be obtained, in particular by comparison with reference values.

Such vibration monitoring systems therefore have one or more inputs for analog signals, which are subjected to a frequency analysis.

Moreover, such monitoring units may also have inputs for other detected variables, but this is often not the case or there are only a small number of such inputs.

On the other hand, as far as assemblies are concerned, in particular assemblies that are subject to vibrations, there are a multitude of parameters that can be monitored apart from or in addition to vibrations, such as for example temperatures or the state of a cooling fluid or an oil.

In the case of the analysis of an oil, particle counting devices, which register various types of particles and detect their frequency or density in the oil/cooling fluid, may be provided for example.

The frequency of specific types of particle allows findings to be obtained as to the state of the oil/cooling fluid or the lubricated components (for example gear wheels, rolling bearings).

Such sensor devices with counting devices for the types/sizes of particles often present the corresponding measured values in digital form, for example at a serial interface, the transmission taking place by way of data packets or vector-like data structures. A data vector may, for example, contain at least two different scalar values, for example different particle concentrations.

The processing of such values with a vibration monitoring device is often difficult.

The present invention is therefore based on the object of detecting such measured values and passing them on or processing them further in a way that is as simple as possible. It should at the same time be taken into consideration that frequency monitoring devices often do not have suitable signal inputs for such sensor devices.

SUMMARY OF THE INVENTION

The object is achieved according to the invention by a monitoring system for an assembly, which comprises a first device for monitoring frequencies, at least one sensor device, which detects one or more measured values, at least one frequency component and a measured value converter which has inputs for the one or more measured values. The measured value converts the one or more measured values into a combined, time-variable analog signal, in which the at least one frequency component represents a measured value.

Therefore, the individual measured values are converted into relative signal strengths of individual periodic, in particular sinusoidal, signals, which have different frequencies, depending on the measured value to be determined, and which are combined within the measured value converter into a single, time-dependent analog signal with a periodic structure.

In this form, the signals can, for example, be entered into a standard input of the vibration monitoring device and be shown separately again and further processed in a frequency analysis device thereof. This takes place by a Fourier transformation or Fourier analysis, in particular a fast Fourier transformation, which separates the individual frequency ranges from one another and can assign them individual intensities. The individual intensities of the various frequencies or frequency ranges thereby represent the measured values to be transmitted.

An advantageous refinement of the invention provides here that the measured value converter converts at least two measured values into different periodic, in particular sinusoidal, signals with different frequencies, the amplitudes of which represent the measured values and which are output as an aggregate signal.

It is advantageously provided that the output of the measured value converter is connected to an analog input of a vibration monitoring device.

To realize the invention, it is also advantageously provided that the vibration monitoring device has a frequency analysis unit, which divides the signal up into different frequency components and outputs the partial signal strengths of the frequency components.

Corresponding supplementary monitoring systems, such as for example oil quality analysis units, often have digital signal processing, which has the effect that corresponding measured values are provided in digital form at an output. As already stated, it may be advantageously provided that the sensor device is an oil monitoring device.

It may also be advantageously provided that the sensor device has sensors for determining the content of one or more types of particle in the oil.

The sensor device may have for this purpose various filters for counting particles of different types or else use different technologies to detect different individual types of particle.

The vibration monitoring system usually has monitored alarm thresholds for specific vibration components, which can likewise be used when the system is used for monitoring other measured values. This may, for example, lead to alarms being set off at specific particle concentrations, which can be variously set as threshold values for different particles, in order for example to warn an operator of a deterioration in the hydraulic or lubricating fluid or the occurrence of wear, and consequently of a failure of the machines.

The invention is shown below on the basis of an exemplary embodiment in a drawing and is subsequently described.

BRIEF DECRIPTION OF THE DRAWINGS

Figure 2:
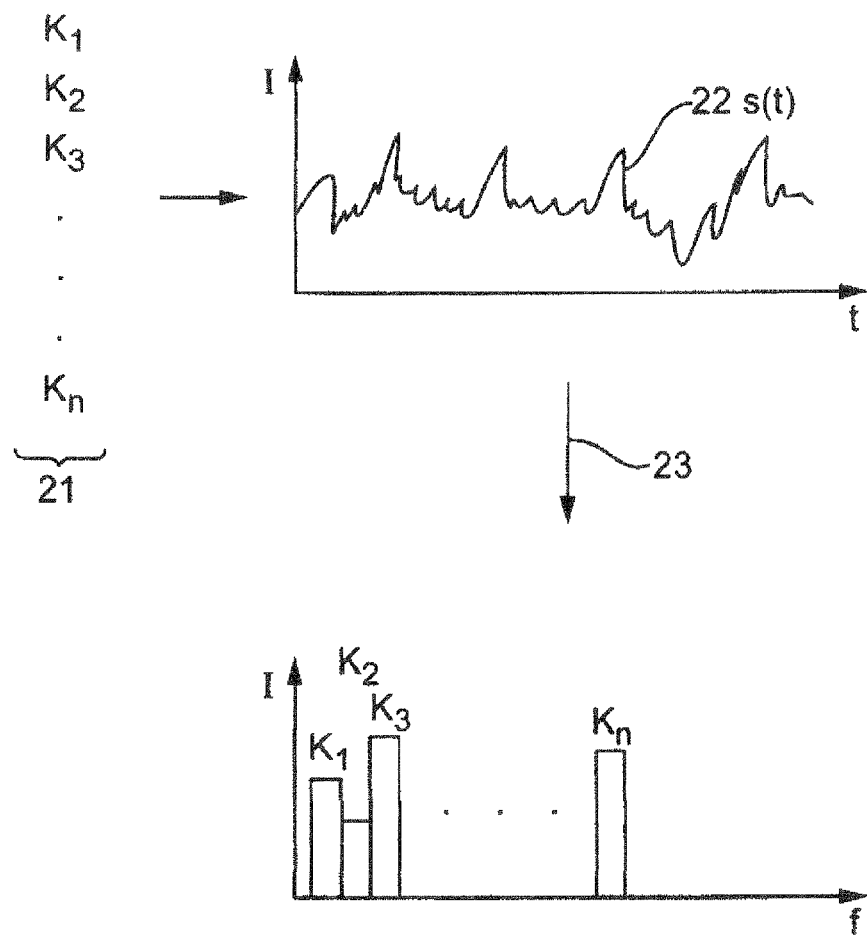

In the drawing:

FIG. 1 shows a schematic representation of a monitoring system with a measured value converter and FIG. 2 schematically shows the transformation of the representation of measured values.

DETAILED DECRIPTION OF THE INVENTION

An application of the invention given by way of example is that, in addition to the vibration diagnosis, an ongoing diagnosis of lubricating oils is carried out for monitoring the state of a rotating machine. Corresponding oil monitoring devices are available in the form of particle counting devices. The corresponding measured values of such devices have the form of groups comprising numbers of particles, for four or more particle classes for example, which may be in the form of measured value vectors. These are typically passed on to evaluation devices via digital serial interfaces.

Since corresponding interfaces are often not available on vibration monitoring devices, the invention has set itself the objective of connecting such digital interfaces to vibration monitoring devices which at least provide free inputs for analog signals that are typically used for vibration analysis.

Vibration monitoring devices sometimes also have inputs for additional individual measured values, but these are often also used for monitoring other aspects in addition to the quality of the oil and are therefore often not free.

FIG. 1 shows a vibration monitoring device 1, which is connected by means of a measured value converter 2 to a sensor device 3, which has oil particle sensors 4, 5 for a machine 6 that is subject to vibrations.

For this purpose, the sensor device 3 has for example, in the sensors, optical counters with corresponding filters or electrical measuring devices, which can detect the concentration of various types of particles in the oil of the machine 6. The corresponding measured values are passed on by means of measuring lines 7 to the sensor device and are made available there at a digital interface 8.

A vibration monitoring device 1, which has various analog signal inputs 9, 10, 11, is available for the evaluation. The input 9 is connected for example to a vibration detection device 12, which picks up a time-dependent analog signal in the form of mechanical vibrations. Starting from the analog signal input 9, the signal is passed on to a vibration analysis device 13, which carries out what is known as a fast Fourier transformation and transforms the signal into the frequency domain, so that vibration intensities in three frequency ranges, for example, are passed on to the modules 14, 15, 16. The corresponding variables designate the intensity of individual isolated vibration modes in the various frequency ranges. These intensities can be passed to an alarm threshold monitoring device 17, which emits signals as soon as specific vibration modes in separate, defined frequency ranges exceed specific intensities. It does this because it may mean that specific changes to the machine have occurred, for example due to bearing damage, and maintenance of the machine therefore has to be undertaken.

Analog input channels similar to the channel 9 are additionally available on the vibration monitoring device 1, and a further analog input channel 11 may serve for processing the signals delivered by the sensor device 3.

Necessary for this purpose is the measured value converter 2, which picks up the digital signal from the interface 8 and transforms it into an analog signal, which can be processed by the vibration monitoring device 1. For this purpose, the measured value converter 2 assigns each individual measured value, that is to say for example each individual particle concentration, a frequency or a frequency range and forms, for example, a sinusoidal oscillation of the corresponding frequency with an intensity that corresponds to the respective measured value. This is schematically represented in the figure by the various oscillators 18, 19, the signals of which are brought together and passed on as an analog aggregate signal to the analog input 11 of the vibration monitoring device.

There, the aggregate signal is divided up again into the individual vibrations by frequency analysis and these are analysed with respect to their individual intensities, so that the individual measured values can be monitored in a threshold monitoring device 20.

If the threshold monitoring device 20 indicates that specific particle concentrations or combinations of concentrations that have previously been fixed as reference values are exceeded, it outputs a signal calling for servicing or maintenance or repair of the electrical machine or a change of the oil.

It is consequently possible by means of the invention to use the signal processing devices that are present in any case in the vibration monitoring device 1 to process other types of measured values, which have nothing to do directly with the detection of vibrations, by a frequency-division multiplexing method.

In this way, the use of additional measured value detection and evaluation devices of different types becomes unnecessary.

All that is needed for this purpose in the measured value converter, apart from a number of oscillators, which may also be of a digital form, is a digital/analog converter for the forming of a time-dependent analog signal. In addition to the scalar measured values with respect to the particle concentrations measured, further status information on the system may also be converted in accordance with the method described above into frequency signals or intensities of specific frequency ranges in order to be able to obtain further status information about the system and process it by means of the frequency monitoring device.

When choosing the frequencies used, it must be ensured that they are separate from corresponding carrier frequencies and, as far as possible, are also not integral multiples of carrier frequencies, and that coupling together of the frequencies used is also minimized.

FIG. 2 shows firstly a set 21 of measured values that are to be evaluated and are converted within the measured value converter 2 into an analog, time-dependent signal 22.

This signal is passed on to the vibration monitoring device 1 and, in method step 23, is transformed there in a frequency analysis device 13 into the frequency domain, so as to obtain there individual intensities K1 to Kn of individual vibrations, which in turn correspond to the corresponding measured values or state parameters and can be evaluated further. The analog signal 22 corresponds for example in its composition to the formula s(t) indicated in FIG. 2.

LIST OF DESIGNATIONS 1 vibration monitoring device
2 measured value converter
3 sensor device
4, 5 oil particle sensors
6 machine
7 measuring lines
8 digital interface
9, 10, 11 analog signal inputs
12 vibration detection device
13 vibration analysis device
14, 15, 16 modules
17 alarm threshold monitoring device
18, 19 oscillators
20 threshold monitoring device
21 set of measured values
22 analog time-dependent signal
23 method step

The invention claimed is:

1. A monitoring system for an assembly, comprising:
a first device for monitoring frequencies;
a vibration detection device, which picks up mechanical vibrations from a rotating machine;
at least one sensor device, which detects one or more measured values, other than a vibration, from the rotating machine; and
a measured value converter having inputs for the one or more measured values, the measured value converter being operative to convert the one or more measured values into a combined, time-variable analog signal, in which at least one frequency component represents a measured value, wherein:
the combined, time-variable analog signal of the measured value converter and the mechanical vibrations detected by the vibration detection device are input to the first device;
the first device is configured to perform an analysis of the rotating machine; and,
the sensor device has a digital signal output for the measured values detected.

2. The monitoring system as claimed in claim 1, wherein the measured value converter converts at least two measured values into different periodic signals with different frequencies that have amplitudes which represent the measured values and which are output as an aggregate signal.

3. The monitoring system as claimed in claim 2, wherein periodic signals are sinusoidal signals.

4. The monitoring system as claimed in claim 3, wherein the first device is a vibration monitoring device having an analog input, wherein an output of the measured value converter is connected to the analog input of the vibration monitoring device.

5. The monitoring system as claimed in claim 4, wherein the vibration monitoring device has a frequency analysis unit, which divides the signal into different frequency components and outputs a partial signal strength of the frequency components.

6. The monitoring system as claimed in claim 1, wherein the digital signal output is formed by a serial interface.

7. The monitoring system as claimed in claim 1, wherein the sensor device is an oil monitoring device.

8. The monitoring system as claimed in claim 7, wherein the sensor device has sensors for determining a content of at least one type of particle in oil.

9. The monitoring system as claimed in claim 1, wherein the first device is a vibration monitoring device that has at least one threshold monitoring device for monitoring the at least one frequency component.

10. A monitoring system for an assembly, comprising:
a first device for monitoring vibration from a rotating machine and including first and second analog signal inputs;
a vibration detection device arranged to detect mechanical vibrations from the rotating machine;
at least one sensor device, which detects one or more measured values, from the rotating machine, other than a vibration; and
a measured value converter:
having at least one input for the one or more measured values; and,
being operative to convert the one or more measured values into a combined, time-variable analog signal, in which at least one frequency component represents a measured value, wherein:
the first device is arranged to:
receive the combined, time-variable analog signal at the first analog input;
pick up, at the second analog input, a time-dependent analog signal, in the form of the mechanical vibrations, from the vibration detection device; and,
transform the time-dependent analog signal into a plurality of frequency ranges; and,
the sensor device has a digital signal output for the measured values detected.

11. A monitoring system for an assembly, comprising:
a first device for monitoring vibration from a rotating machine and including first and second analog signal inputs;
a vibration detection device arranged to detect mechanical vibrations from the rotating machine;
at least one sensor device, which detects one or more measured values, from the rotating machine, other than a vibration;
an alarm threshold monitoring device; and
a measured value converter:
having at least one input for the one or more measured values; and,
being operative to convert the one or more measured values into a combined, time-variable analog signal, in which at least one frequency component represents a measured value, wherein:
the first device is arranged to:
receive the combined, time-variable analog signal at the first analog input;
pick up, at the second analog input, a time-dependent analog signal, in the form of the mechanical vibrations, from the vibration detection device;
transform the time-dependent analog signal into a plurality of frequency ranges; and,
transmit the plurality of frequency ranges to the alarm threshold monitoring device;
the alarm threshold monitoring device is arranged to a signal when a frequency range exceeds a specific intensity; and,
the sensor device has a digital signal output for the measured values detected.

* * * * *